US012617952B1

(12) United States Patent　　　(10) Patent No.:　US 12,617,952 B1
Albalawi et al.　　　　　　　　　(45) Date of Patent:　　May 5, 2026

(54) SELF-AMELIORATE-FISSURE-RESPONSIVE POD SYSTEM FOR ALKYD-POLYESTER AIRCRAFT RUNWAY PAINT

(71) Applicant: UNIVERSITY OF TABUK, Tabuk (SA)

(72) Inventors: Mona Obead Albalawi, Tabuk (SA); Moatassim Mohamed Raoof Mohamed Rashad Shindy, Alexandria (EG); Magdy Youssef Ali Abdelaal, Mansoura (EG); Humaira Parveen, Tabuk (SA); Mohammed Suliman M. Almoiqli, Riyad (SA)

(73) Assignee: UNIVERSITY OF TABUK, Tabuk (SA)

( * ) Notice: Subject to any disclaimer, the term of this patent is extended or adjusted under 35 U.S.C. 154(b) by 0 days.

(21) Appl. No.: 19/387,772

(22) Filed: Nov. 13, 2025

(51) Int. Cl.
| | |
|---|---|
| *C09D 167/06* | (2006.01) |
| *B01J 13/08* | (2006.01) |
| *C09D 7/40* | (2018.01) |
| *C09D 7/63* | (2018.01) |
| *C09D 7/65* | (2018.01) |

(52) U.S. Cl.
CPC ............... *C09D 7/70* (2018.01); *B01J 13/08* (2013.01); *C09D 7/63* (2018.01); *C09D 7/65* (2018.01); *C09D 7/69* (2018.01); *C09D 167/06* (2013.01)

(58) Field of Classification Search
None
See application file for complete search history.

(56) References Cited

U.S. PATENT DOCUMENTS

| | | | |
|---|---|---|---|
| 7,342,057 B2 | 3/2008 | Kumar et al. | |
| 9,296,895 B2 | 3/2016 | Wilson | |
| 12,054,630 B2 * | 8/2024 | Zhou .................... | C09D 167/08 |
| 2011/0262759 A1 * | 10/2011 | Wu ........................ | C08G 18/44 |
| | | | 428/480 |
| 2013/0196071 A1 * | 8/2013 | Yang ........................ | C09D 7/70 |
| | | | 427/386 |
| 2015/0079290 A1 * | 3/2015 | Yang .................... | C09D 161/24 |
| | | | 427/331 |
| 2017/0051157 A1 * | 2/2017 | Chaloner-Gill ...... | C09D 133/04 |
| 2019/0000116 A1 * | 1/2019 | Pandey .................. | A23L 33/20 |
| 2020/0131095 A1 * | 4/2020 | Wilson .................. | B27K 3/15 |

FOREIGN PATENT DOCUMENTS

| | | |
|---|---|---|
| CN | 115073044 B | 9/2023 |

OTHER PUBLICATIONS

Tomasz Szmechtyk, et al., "Polythiourethane microcapsules as novel self-healing systems for epoxy coatings". Polym. Bull. (2028) 75:148-165, 17 Pages.
"Sage Journals" High Performance Polymers. Curing of epoxy/alkyd blends in self-healing coating *Abstract*. 8 Pages.

* cited by examiner

*Primary Examiner* — Peter A Salamon
(74) *Attorney, Agent, or Firm* — Oblon, McClelland, Maier & Neustadt, L.L.P.

(57) ABSTRACT

An alkyd-polyester paint which includes an alkyd resin, a polyester resin and three fissure-responsive microcapsules. The first microcapsule contains an epoxy resin, a polythiol and a hypervalent iodine compound. The second microcapsule contains a diamine and a photoinitiator. The third microcapsule contains a phosphine.

20 Claims, 2 Drawing Sheets

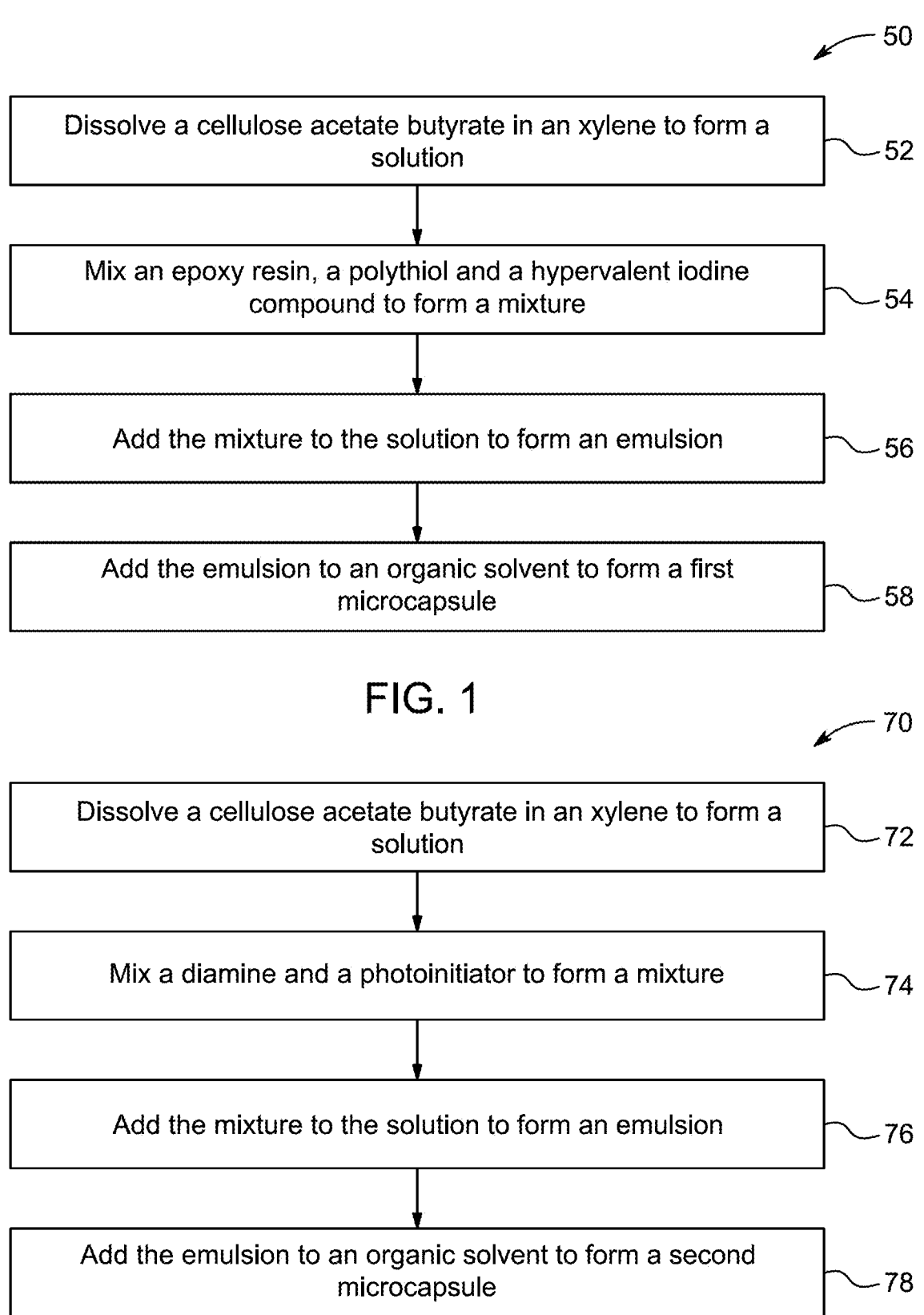

50

| Dissolve a cellulose acetate butyrate in an xylene to form a solution | 52 |

↓

| Mix an epoxy resin, a polythiol and a hypervalent iodine compound to form a mixture | 54 |

↓

| Add the mixture to the solution to form an emulsion | 56 |

↓

| Add the emulsion to an organic solvent to form a first microcapsule | 58 |

| Dissolve a cellulose acetate butyrate in an xylene to form a solution | 72 |

↓

| Mix a diamine and a photoinitiator to form a mixture | 74 |

↓

| Add the mixture to the solution to form an emulsion | 76 |

↓

| Add the emulsion to an organic solvent to form a second microcapsule | 78 |

FIG. 2

SELF-AMELIORATE-FISSURE-RESPONSIVE POD SYSTEM FOR ALKYD-POLYESTER AIRCRAFT RUNWAY PAINT

BACKGROUND

Technical Field

The present disclosure is directed towards a synthesis of an alkyd-polyester paint, more particularly, an alkyd-polyester paint used for aircraft runway paints.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

The maintenance and durability of important infrastructure such as airport runways present significant technical and operational challenges. Runway surfaces are subjected to extreme mechanical stresses from continuous aircraft activities, including landings, take-offs, and taxiing. In addition to these dynamic loads, the surfaces endure harsh environmental conditions, such as wide-ranging temperature fluctuations and prolonged exposure to chemically aggressive substances like jet fuel, hydraulic fluids, and de-icing agents. These combined factors often result in the rapid degradation of surface coatings, leading to the formation of cracks, fissures, and other structural discontinuities. Such deterioration not only includes the visibility and functional markings important for safe aircraft operations but also accelerates the deterioration of the underlying substrate. This, in turn, necessitates frequent repair cycles and reapplication of protective coatings-activities that are both costly and time-intensive, often requiring partial or complete runway closures that disrupt normal airport operations.

In response to these challenges, significant research efforts have been directed toward the development of self-healing polymeric materials capable of autonomously repairing minor damage and restoring the protective integrity of coatings. Among the various strategies investigated, microcapsule-based self-healing systems have gained particular prominence. These systems are typically designed to encapsulate reactive healing agents that are released upon mechanical damage to the coating, triggering a localized repair mechanism at the site of injury.

One solution utilizes a system comprising unsaturated polyester resin chemistry. Upon capsule rupture, healing is initiated through oxygen-induced cross-linking reactions. While this technology demonstrates some potential for durability and general coating applications, it is not specifically designed to withstand the extreme demands of airport runway environments. In particular, it does not address performance requirements such as enhanced resistance to chemical attack or high thermal stability-properties important for coatings exposed to aviation-related stressors.

Another solution comprises a self-healing coating system developed to mitigate the spread of lead dust. In this approach, microcapsules release film-forming agents upon physical damage to seal affected areas. However, this solution is primarily intended for general or environmental applications and lacks consideration for the unique combination of thermal and chemical stress experienced by runway surfaces.

A third solution describes a thermosetting polyurethane asphalt material that incorporates slow-release microcapsule technology. Here, amine curing agents are released under applied load to improve the material's mechanical response. Although promising in theory, this system requires high-temperature processing in the range of 80-160° C. during mixing and curing. Such elevated temperatures may degrade sensitive healing agents, limiting their effectiveness in real-time ambient healing scenarios. However, this solution does not have chemical resistance or long-term thermal stability, further limiting its applicability in aviation infrastructure.

While the existing research reflects meaningful progress in the field of self-healing materials, these technologies fall short of providing a comprehensive, robust solution tailored to the extreme environmental, chemical, and mechanical conditions of airport runways. The unmet need for advanced coating systems capable of autonomous repair under such conditions highlights the importance of developing self-healing polymers specifically engineered for the demands of aviation infrastructure.

Accordingly, one object of the present disclosure is to provide a method of synthesizing an alkyd-polyester paint that may circumvent the above specified drawbacks and limitation of the materials and methods known in the art.

SUMMARY

In an exemplary embodiment, an alkyd-polyester paint is described. The alkyd-polyester paint includes an alkyd resin, a polyester resin and three fissure-responsive microcapsules. A first microcapsule contains an epoxy resin, a polythiol and a hypervalent iodine compound. A second microcapsule contains a diamine and a photoinitiator. A third microcapsule contains a phosphine.

In some embodiments, the alkyd-polyester paint further includes a pigment.

In some embodiments, the pigment is at least one selected from the group consisting of titanium dioxide (rutile and anatase), zinc oxide, zinc sulfide, lithopone, antimony trioxide, carbon black, black iron oxide, red iron oxide, yellow iron oxide, diarylide yellow, bismuth vanadate, chromium oxide green, phthalocyanine blue, phthalocyanine green, ultramarine blue, molybdate orange, chrome yellow, quinacridone red, and toluidine red. In a preferred embodiment for high-visibility runway markings, the pigment is titanium dioxide, rutile grade. For yellow runway markings, diarylide yellow or yellow iron oxide are preferred.

In some embodiments, the alkyd-polyester paint further includes a rheology modifier, a UV stabilizer, and an anti-settling agent. The alkyd-polyester paint further includes performance additives selected from rheology modifiers, UV stabilizers, and anti-settling agents.

Suitable rheology modifiers include, but are not limited to, organoclay compounds, fumed silica, polyamide waxes, polyurethane associative thickeners, and castor oil derivatives. In a preferred embodiment, an organoclay rheology modifier, fumed silica, or a combination thereof is used to ensure suspension of microcapsules and prevent sagging.

Suitable UV stabilizers include a combination of UV absorbers and hindered amine light stabilizers (HALS). Usable UV absorbers include benztriazoles, oxanilides, and triazines. Usable HALS include hindered amine derivatives. In a preferred embodiment, a benztriazole-type UVA (e.g., Tinuvin® 1130) is used in combination with a HALS (e.g., Tinuvin® 123) to synergistically prevent photodegradation and yellowing.

Suitable anti-settling agents include, but are not limited to, organoclays, precipitated silica, metal soaps, hydrogenated castor oil, and polyethylene wax. In a preferred embodiment, an organoclay compound is used for its dual functionality as a rheology modifier and anti-settling agent, ensuring the homogeneous dispersion of pigments and microcapsules throughout the shelf life of the product.

In some embodiments, the epoxy resin is one or more selected from the group consisting of bisphenol A diglycidyl ether (DGEPA), a diglycidyl ether of bisphenol F (DGEBF), and a cycloaliphatic epoxy.

In some embodiments, the polythiol is polyerythritol tetrakis merkaptopropionate (PTKMP).

In some embodiments, the hypervalent iodine compound is iodobenzene diacetate (IBDA).

In some embodiments, the photoinitiator is 2,2-dimethoxy-2-phenylacetophenone (DMPA).

In some embodiments, the diamine is N,N,N',N'-tetramethyl-1,6-hexanediamine.

In some embodiments, the microcapsules are made of a polymer selected from the group consisting of cellulose acetate butyrate, ethyl cellulose, polylactide, and poly(methyl methacrylate).

In some embodiments, the phosphine is tributyl phosphine (TBP).

In some embodiments, the three microcapsules are uniformly dispersed throughout the paint.

In some embodiments, the microcapsules are spherical and have a diameter of 10-100 μm.

In some embodiments, the microcapsules are 1-30 wt % of the paint.

In some embodiments, the microcapsules have a shell thickness of 100 nm-1 μm.

In some embodiments, the microcapsules are configured to rupture due to impact forces, shear forces and/or abrasion and upon rupture release their contents. The contents of the microcapsules polymerize upon being released.

In some embodiments, the microcapsules rupture under pressures of 10-100 MPa and shear forces of 5-50 MPa.

In another exemplary embodiment, a method of making the alkyd resin is described. The method includes heating pentaerythritol and a fatty acid at 150-200° C. under nitrogen for 1-3 hours to form monoglycerides. The method further includes adding phthalic anhydride to the monoglycerides and heating the mixture to 200-260° C. to form the alkyd resin.

In another exemplary embodiment, a method of making the first microcapsule is described. The method includes dissolving cellulose acetate butyrate in xylene to form a solution. The method further includes mixing an epoxy resin, a polythiol and a hypervalent iodine compound to form a mixture followed by adding the mixture to the solution to form an emulsion. The method further includes adding an emulsion to an organic solvent to form the first microcapsule.

In another exemplary embodiment, a method of making the second microcapsule is described. The method includes dissolving cellulose acetate butyrate in xylene to form a solution. The method further includes mixing a diamine and a photoinitiator to form a mixture followed by adding the mixture to the solution to form an emulsion. The method further includes adding the emulsion to an organic solvent to form the second microcapsule.

In another exemplary embodiment, a method of making the third microcapsule is described. The method includes dissolving cellulose acetate butyrate in xylene to form a solution. The method further includes mixing a phosphine to form a mixture followed by adding the mixture to the solution to form an emulsion. The method further includes adding the emulsion to an organic solvent to form the third microcapsule.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is a schematic diagram of an exemplary flow chart of a method of making the first microcapsule, according to certain embodiments.

FIG. 2 is a schematic diagram of an exemplary flow chart of a method of making the second microcapsule, according to certain embodiments.

DETAILED DESCRIPTION

Figure 3:
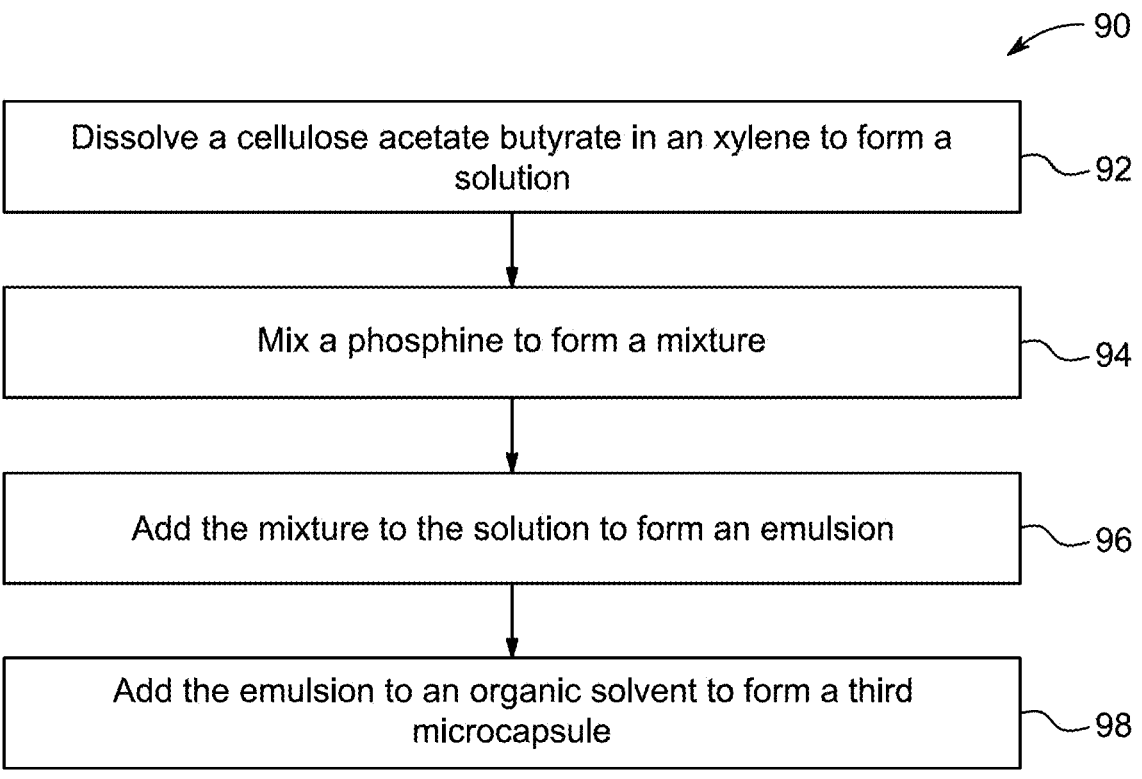
FIG. 3 is a schematic diagram of an exemplary flow chart of a method of making the third microcapsule, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'alkyd-polyester paint' refers to a composite paint formulation including a blend of alkyd and polyester resins, designed to combine the flexibility, adhesion, and drying properties of alkyds with the chemical and weather resistance of polyesters, particularly suitable for high-performance applications like aircraft runway markings.

As used herein, the term 'alkyd resin' refers to a synthetic resin obtained by the polycondensation of polyols, dibasic acids or anhydrides, and fatty acids or oils, commonly used in coatings due to its excellent film-forming, flexibility, and gloss retention characteristics. The alkyd resin may include, but are not limited to, fatty acid chains, including polyester urethanes and polyester amides, polyols such as glycerol, or polyester modified with of oils and/or fatty acids.

As used herein, the term 'alkyd resin' refers to a synthetic resin obtained by the polycondensation of polyols, dibasic acids or anhydrides, and fatty acids or oils. The alkyd resin may include, but are not limited to, oil-modified alkyds classified by oil length (short, medium, or long) and by the type of oil used, including soybean oil alkyds, linseed oil alkyds, tung oil alkyds, coconut oil alkyds, and castor oil alkyds. Modified alkyds, such as styrenated alkyds, silicone-modified alkyds, and polyurethane-modified alkyds (uralkyds) are also included. In a preferred embodiment, the alkyd resin is a medium-oil alkyd derived from the esterification of pentaerythritol, phthalic anhydride, and soybean oil fatty acids, as this composition provides an optimal balance of drying time, flexibility, hardness, and chemical resistance for high-traffic pavement markings.

As used herein, the term 'polyester resin' refers to a synthetic polymer formed by the reaction of polyhydric alcohols with polybasic acids or anhydrides, known for its strong mechanical properties, chemical resistance, and durability in harsh environments. Usable examples thereof include polyethylene terephthalate, polypropylene terephthalate, polybutylene terephthalate, polyethylene-2,6-naphthalate, poly-1,4-cyclohexanedimethylene terephthalate, and 1,4-cyclohexanedimethanol copolymerized polyethylene terephthalate. Further, these resins may be a homo-resin, a copolymer, or a blend.

As used herein, the term 'polyester resin' refers to a synthetic polymer formed by the polycondensation of polyhydric alcohols (polyols) with polybasic acids or anhydrides, known for its strong mechanical properties, chemical resistance, and durability in harsh environments. Usable examples thereof include saturated polyesters such as polyethylene terephthalate (PET), polybutylene terephthalate (PBT), and polypropylene terephthalate (PPT); unsaturated polyester resins (UPR) derived from glycols such as propylene glycol or neopentyl glycol, unsaturated acids or anhydrides such as maleic anhydride or fumaric acid, and saturated acids or anhydrides such as phthalic anhydride or isophthalic acid; and hydroxyl-functional saturated polyesters. Further, these resins may be a homo-resin, a copolymer, or a blend. In a preferred embodiment for coating applications, the polyester resin is an unsaturated polyester resin or a hydroxyl-functional saturated polyester resin, as these types contribute to the crosslinked network of the cured paint film, enhancing its overall durability and chemical resistance.

As used herein, the term 'fissure-responsive microcapsules' refers to microcapsules embedded within a coating matrix that are engineered to rupture upon the formation of surface fissures or cracks, thereby releasing healing agents that initiate in-situ repair and prolong coating life.

As used herein, the term 'epoxy resin' refers to a thermosetting polymer containing reactive epoxide groups that, when cured with appropriate hardeners, forms a rigid, chemically resistant network widely used in coatings, adhesives, and composites.

As used herein, the term 'polythiol' refers to an organic compound containing two or more thiol (—SH) functional groups, which can act as curing agents or crosslinkers in polymer systems, especially for thiol-epoxy click reactions.

As used herein, the term 'hypervalent iodine' refers to a class of iodine compounds where iodine exhibits a valency greater than three, typically used as oxidizing agents or radical initiators in organic and polymer chemistry.

As used herein, the term 'photoinitiator' refers to a chemical compound that absorbs light (typically UV or visible) and undergoes a photochemical reaction to generate reactive species (e.g., free radicals) that initiate polymerization or curing of a resin system.

As used herein, the term 'mechanical stress' refers to the internal force per unit area within a material that arises due to externally applied loads such as compression, tension, bending, or impact, potentially leading to deformation or failure.

As used herein, the term 'shell stress' refers to the internal stress experienced by the wall or shell of a microcapsule as a result of external mechanical forces, environmental factors, or internal pressure, which may cause the shell to rupture and release the encapsulated contents.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

An aspect of the present disclosure is directed to an alkyd-polyester paint, and more particularly, to an alkyd-polyester paint formulated for use in aircraft runway applications. This specialized paint provides enhanced durability, weather resistance, and strong adhesion to withstand the extreme mechanical and environmental stresses encountered on airport runways.

An alkyd-polyester paint is described. The alkyd-polyester paint includes an alkyd resin, a polyester resin and three fissure-responsive microcapsules. The alkyd-polyester paint further includes a pigment. The alkyd-polyester paint further includes a rheology modifier, a UV stabilizer, an anti-settling agent.

The first microcapsule containing an epoxy resin, a polythiol and a hypervalent iodine compound. In some embodiments, the epoxy resin may include, but is not limited to, cycloaliphatic epoxy resin, novolac epoxy resin, glycidyl ether epoxy resin, hydrogenated bisphenol A epoxy resin, tetraglycidyl diamino diphenyl methane, triglycidyl p-aminophenol, glycidyl amine epoxy resin, aliphatic epoxy resin, glycidyl ester epoxy resin, epoxidized soybean oil, epoxidized linseed oil, vinylcyclohexene dioxide, dicyclopentadiene dioxide, diglycidyl tetrahydrophthalate, polyglycidyl ether of phenol formaldehyde novolac, glycidyl ether of cresol novolac, silicone-modified epoxy resin, fluorinated epoxy resin, brominated epoxy resin, phosphorus-containing epoxy resin, urethane-modified epoxy resin, rubber-modified epoxy resin, acrylic epoxy resin, epoxy-functionalized polysiloxane, naphthalene-based epoxy resin, phenol aralkyl epoxy resin, cardanol-based epoxy resin, glycidyl isocyanurate, polyglycidyl ether of resorcinol, glycidyl ether of hydroquinone, glycidyl ether of catechol, and epoxidized polybutadiene. In a present disclosure, the epoxy resin is one or more selected from the group consisting of bisphenol A diglycidyl ether (DGEPA), a diglycidyl ether of bisphenol F (DGEBF), and a cycloaliphatic epoxy.

In some embodiments, the polythiol may include, but is not limited to, trimethylolpropane tris(3-mercaptopropionate), pentaerythritol tetrakis(3-mercaptopropionate), ethylene glycol bis(mercaptoacetate), dipentaerythritol hexakis (3-mercaptopropionate), 1,2-ethanedithiol, 1,3-propanedithiol, 1,4-butanedithiol, 1,6-hexanedithiol, 2-mercaptoetha-nol, 3-mercaptopropionic acid, benzene-1,2,4-trithiol, trith-iocyanuric acid, glycerol tris(thioglycolate), 2,2'-dithiodiethanol, dithiothreitol, thioglycerol, bis(3-mercaptopropyl) ether, bis(2-mercaptoethyl) ether, dithiobutylamine, dithiopropionic acid, tetrakis(2-mercapto-ethyl) orthosilicate, cysteamine, cysteine, glutathione, thio-malic acid, 2-mercaptosuccinic acid, mercaptoundecanoic acid, 4-mercaptobenzoic acid, and mercaptomethylsiloxane. In a present disclosure, the polythiol is polyerythritol tetra-kis merkaptopropionate (PTKMP).

In some embodiments, the hypervalent iodine compound may include, but is not limited to, [bis(trifluoroacetoxy)iodo]benzene, iodobenzene dichloride, iodosylbenzene, [hy-droxy(tosyloxy)iodo]benzene, [bis(acetoxy)iodo]toluene, [diacetoxyiodo]anisole, iodo(III)perfluorobenzene, [bis(trif-luoroacetoxy)iodo]toluene, 2-iodoxybenzoic acid (IBX), Dess-Martin periodinane (DMP), 1-hydroxy-1,2-benzio-doxol-3-(1H)-one, [bis(acetoxy)iodo]mesitylene, [hydroxy (perfluorooctanesulfonoxy)iodo]benzene, iodo(III)azoben-zene, [bis(pivaloyloxy)iodo]benzene, iodo(III)cyan-obenzene, iodo(III)-substituted ferrocene, [bis(acetoxy)iodo]naphthalene, iodo(III)benzotriazole, [tosyloxy (trifluo-roacetoxy)iodo]benzene, [bis(benzoate)iodo]benzene, 3,3-dimethyl-1-(aryl)-1,2-benziodoxole, 1-acetoxy-1,2-benziodoxol-3-(1H)-one, iodo(III) phenyl ketone, iodo(III)-containing calixarene, iodo(III)-functionalized imidazole, 1-iodo-3,3-dimethyl-1,2-benziodoxole, iodo(III)-quinoline derivative, and 2-iodoxybenzenesulfonic acid. In a present disclosure, the hypervalent iodine compound is iodobenzene diacetate (IBDA).

The second microcapsule containing a diamine and a photoinitiator. In some embodiments, the photoinitiator may include, but is not limited to, benzoin methyl ether, benzoin ethyl ether, benzoin isobutyl ether, benzoin isopropyl ether, benzil, benzil dimethyl ketal, 1-hydroxycyclohexyl phenyl ketone, 2-benzyl-2-(dimethylamino)-1-(4-morpholinophe-nyl)-butanone-1, ethyl 4-dimethylaminobenzoate, isopropy-lthioxanthone, 2-chlorothioxanthone, 2-methylthioxan-thone, camphorquinone, benzophenone, acetophenone, 4-methoxyacetophenone, 4-phenylbenzophenone, 2-ethyl-hexyl 4-dimethylaminobenzoate, diphenyl(2,4,6-trimethyl-benzoyl)phosphine oxide (TPO), bis(2,4,6-trimethylben-zoyl)-phenylphosphine oxide (BAPO), phenylbis(2,4,6-trimethylbenzoyl)phosphine oxide, thioxanthone, 1-phenyl-1,2-propanedione, 2,4,6-trimethylbenzoyldiphe-nylphosphine oxide, 2-hydroxy-2-methyl-1-phenylpropan-1-one, methyl o-benzoylbenzoate, diethoxyacetophenone, 2-isopropylthioxanthone, 1,1-dichloroacetophenone, and 4,4'-bis(dimethylamino)benzophenone. In a present disclo-sure, the photoinitiator is 2,2-dimethoxy-2-phenylacetophe-none (DMPA).

In some embodiments, the diamine may include, but is not limited to, ethylenediamine, hexamethylenediamine, 1,3-diaminopropane, 1,4-diaminobutane, 1,5-diaminopentane, 1,6-diaminohexane, p-phenylenediamine, m-phenylenedi-amine, o-phenylenediamine, 4,4'-diaminodiphenylmethane, 3,3'-diaminodiphenylmethane, 4,4'-diaminodiphenyl sulf-one, isophorone diamine, 2-methylpentamethylenediamine, 1,2-diaminocyclohexane, cyclohexane-1,4-diamine, 4,4'-di-aminodicyclohexylmethane, xylylenediamine, 1,3-bis(ami-nomethyl)cyclohexane, 1,8-diaminooctane, 1,10-diamino-decane, 1,2-diaminopropane, 2,2-bis(aminomethyl)-1,3-propanediol, bis(4-aminocyclohexyl) methane, 3,5-diaminobenzoic acid, 2,6-diaminopyridine, diamino-naphthalene, bis(3-aminopropyl)amine, and 4,4'-methylenebis(cyclohexylamine). In a present disclosure, the diamine is N,N,N',N'-tetramethyl-1,6-hexanediamine.

The third microcapsule containing a phosphine. In some embodiments, the phosphine may include, but is not limited to, triphenylphosphine, triethylphosphine, trimethylphos-phine, tripropylphosphine, triisopropylphosphine, tricyclo-hexylphosphine, tris(2-methoxyphenyl)phosphine, tris(4-methoxyphenyl)phosphine, tris(4-fluorophenyl)phosphine, tris(3,5-dimethylphenyl)phosphine, tris(p-tolyl)phosphine, tris(m-tolyl)phosphine, tris(o-tolyl)phosphine, tris(2-furyl) phosphine, tris(2-thienyl)phosphine, tris(2-pyridyl)phos-phine, tri(o-anisyl)phosphine, tri(naphthyl)phosphine, tris (4-chlorophenyl)phosphine, tris(4-trifluoromethylphenyl) phosphine, dimethylphenylphosphine, diphenylmethyl-phosphine, dicyclohexylphenylphosphine, diphenylcyclo-hexylphosphine, methyldicyclohexylphosphine, dimethyl-cyclohexylphosphine, methyldiethylphosphine, diisopropy-lphenylphosphine, bis(2-methoxyphenyl)phenylphosphine, and diphenyl-2-pyridylphosphine. In a present disclosure, the phosphine is tributyl phosphine (TBP).

In some embodiments, the microcapsules are made of a polymer and may include, but are not limited to, polyurea, polyurethane, polyamide, polystyrene, polymethyl meth-acrylate, polyethylene, polypropylene, polyvinyl alcohol, polylactic acid, poly(lactic-co-glycolic acid), gelatin, chito-san, alginate, polyacrylonitrile, polyacrylamide, polyethyl-ene glycol, polydimethylsiloxane, polycarbonate, and poly-vinylpyrrolidone. In some embodiments, the microcapsulesare made of a polymer selected from the group consisting of cellulose acetate butyrate, ethyl cellu-lose, polylactide, and poly(methyl methacrylate). In a pres-ent disclosure, the polymer is cellulose acetate butyrate.

In some embodiments, the microcapsules consists essen-tially of sheet morphologies, preferably nanosheets, although other morphologies such as nanowires, nano-spheres, nanocrystals, nanorectangles, nanotriangles, nano-pentagons, nanohexagons, nanoprisms, nanodisks, nano-cubes, nanoribbons, nanoblocks, nanotoroids, nanodiscs, nanobarrels, nanogranules, nanowhiskers, nanoflakes, nano-foils, nanopowders, nanoboxes, nanobeads, nanobelts, nano-urchins, nanoflowers, nanostars, tetrapods, and their mix-tures thereof are also possible. In a present disclosure, the microcapsules are spherical. In a present disclosure, the three microcapsules are uniformly dispersed throughout the paint.

In some embodiments, the microcapsules may have a diameter range from 10-100 μm, preferably 20-100 μm, preferably 30-100 μm, preferably 40-100 μm, preferably 50-100 μm, preferably 60-100 μm, preferably 70-100 μm, preferably 80-100 μm, preferably 90-100 μm. In a present disclosure, the diameter of microcapsules is 40-80 μm.

In some embodiments, the microcapsules may have 1-30 wt %, preferably 2-30 wt %, preferably 4-30 wt %, prefer-ably 6-30 wt %, preferably 8-30 wt %, preferably 10-30 wt %, preferably 12-30 wt %, preferably 14-30 wt %, prefer-ably 16-30 wt %, preferably 18-30 wt %, preferably 20-30 wt %, preferably 22-30 wt %, preferably 24-30 wt %, preferably 26-30 wt %, preferably 28-30 wt % of the paint. In a present disclosure, the microcapsules are 5-20 wt % of the paint.

In some embodiments, the microcapsules have a shell thickness ranges from 100 nm-1 μm, preferably 200 nm-1 μm, preferably 300 nm-1 μm, preferably 400 nm-1 μm, preferably 500 nm-1 μm, preferably 600 nm-1 μm, prefer-ably 700 nm-1 μm, preferably 800 nm-1 μm, preferably 900 nm-1 μm. In a present disclosure, the microcapsules have a shell thickness of 200 nm-0.7 μm.

In some embodiments, the microcapsules are configured to rupture due to thermal expansion, osmotic pressure, solvent diffusion, hydrolysis, enzymatic degradation, UV radiation, pH change, redox reaction, ultrasonic waves, magnetic field, electric field, microwave heating, chemical reaction, photoactivation, swelling pressure, internal gas generation, ionic strength variation, electrostatic interaction, temperature-induced phase transition, and moisture absorption. In a present disclosure, the microcapsules are configured to rupture due to mechanical stress and shell stress. In a present disclosure, the microcapsules are configured to rupture due to impact forces, shear forces and/or abrasion and upon rupture release their contents. The contents of the microcapsules polymerize upon being released.

In some embodiments, the microcapsules rupture under pressures of 10-100 MPa, preferably 20-100 MPa, preferably 30-100 MPa, preferably 40-100 MPa, preferably 50-100 MPa, preferably 60-100 MPa, preferably 70-100 MPa, preferably 80-100 MPa, preferably 90-100 MPa. In some embodiments, the microcapsules rupture under shear forces of 5-50 MPa, preferably 10-50 MPa, preferably 15-50 MPa, preferably 20-50 MPa, preferably 25-50 MPa, preferably 30-50 MPa, preferably 35-50 MPa, preferably 40-50 MPa, preferably 45-50 MPa.

A method of making the alkyd resin is described. The method includes heating pentaerythritol and a fatty acid at 150-200° C. under nitrogen for 1-3 hours to form monoglycerides. In some embodiments, the concentration of pentaerythritol may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of pentaerythritol is 15 pbw.

In some embodiments, the fatty acid may include, but is not limited to, linoleic acid, oleic acid, palmitic acid, stearic acid, myristic acid, lauric acid, arachidic acid, behenic acid, lignoceric acid, capric acid, caprylic acid, caproic acid, alpha-linolenic acid, gamma-linolenic acid, eicosapentaenoic acid (EPA), docosahexaenoic acid (DHA), erucic acid, palmitoleic acid, nervonic acid, ricinoleic acid, hydroxy stearic acid, elaidic acid, margaric acid, heneicosanoic acid, pentadecanoic acid, nonadecanoic acid, tridecanoic acid, undecanoic acid, cerotic acid, and heptadecanoic acid. In a present disclosure, the fatty acid is soyabean oil. In some embodiments, the concentration of fatty oil may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of fatty oil is 60 pbw.

In some embodiments, an inert atmosphere may be attained by using argon, helium, neon, xenon, krypton, carbon dioxide, sulfur hexafluoride, hydrogen (in specific reducing environments), methane, ethane, propane, isobutane, tetrafluoromethane, perfluoropropane, perfluorohexane, chlorofluorocarbons, dimethyl ether, ammonia (in specific controlled settings), steam (for displacement purposes), and vacuum (as an inert environment by absence of reactive gases). In a present disclosure, an inert atmosphere is attained by nitrogen purge.

In some embodiments, mixture may heat at a temperature ranging from 150-200° C., preferably 155-200° C., preferably 160-200° C., preferably 165-200° C., preferably 170-200° C., preferably 175-200° C., preferably 180-200° C., preferably 185-200° C., preferably 190-200° C., preferably 195-200° C. under nitrogen for 1-3 hours, preferably 1.2-3 hours, preferably 1.4-3 hours, preferably 1.6-3 hours, preferably 1.8-3 hours, preferably 2-3 hours, preferably 2.2-3 hours, preferably 2.4-3 hours, preferably 2.6-3 hours, preferably 2.8-3 hours. In a present disclosure, the mixture is heated at a temperature of 180-200° C. under nitrogen for 1-2 hours.

The method of making the alkyd resin further includes adding phthalic anhydride to the monoglycerides and heating the mixture to 200-260° C. to form the alkyd resin. In some embodiments, the concentration of phthalic anhydride may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of phthalic anhydride is 25 pbw.

In some embodiments, the mixture may heat at a temperature ranging from 200-260° C., preferably 205-260° C., preferably 210-260° C., preferably 215-260° C., preferably 220-260° C., preferably 225-260° C., preferably 230-260° C., preferably 235-260° C., preferably 240-260° C., preferably 245-260° C., preferably 250-260° C., preferably 255-260° C.

FIG. 1 illustrates a schematic flow chart of a method 50 of making the first microcapsule. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes dissolving cellulose acetate butyrate in xylene to form a solution. In some embodiments, the concentration of cellulose acetate butyrate may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of cellulose acetate butyrate is 10 pbw.

In some embodiments, the concentration of xylene may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of xylene is 30 pbw.

At step 54, the method 50 includes mixing an epoxy resin, a polythiol and a hypervalent iodine compound to form a mixture.

In some embodiments, the epoxy resin may include, but is not limited to, cycloaliphatic epoxy resin, novolac epoxy resin, glycidyl ether epoxy resin, hydrogenated bisphenol A epoxy resin, tetraglycidyl diamino diphenyl methane, triglycidyl p-aminophenol, glycidyl amine epoxy resin, aliphatic epoxy resin, glycidyl ester epoxy resin, epoxidized soybean oil, epoxidized linseed oil, vinylcyclohexene dioxide, dicyclopentadiene dioxide, diglycidyl tetrahydrophthalate, polyglycidyl ether of phenol formaldehyde novolac, glycidyl ether of cresol novolac, silicone-modified epoxy resin, fluorinated epoxy resin, brominated epoxy resin, phosphorus-containing epoxy resin, urethane-modified epoxy resin, rubber-modified epoxy resin, acrylic epoxy resin, epoxy-functionalized polysiloxane, naphthalene-based epoxy resin, phenol aralkyl epoxy resin, cardanol-based epoxy resin, glycidyl isocyanurate, polyglycidyl ether of resorcinol, glycidyl ether of hydroquinone, glycidyl ether of catechol, and epoxidized polybutadiene. In a present disclosure, the epoxy resin is one or more selected from the group consisting of bisphenol A diglycidyl ether (DGEPA), a diglycidyl ether of bisphenol F (DGEBF), and a cycloaliphatic epoxy.

In some embodiments, the polythiol may include, but is not limited to, trimethylolpropane tris(3-mercaptopropionate), pentaerythritol tetrakis(3-mercaptopropionate), ethylene glycol bis(mercaptoacetate), dipentaerythritol hexakis (3-mercaptopropionate), 1,2-ethanedithiol, 1,3-propanedithiol, 1,4-butanedithiol, 1,6-hexanedithiol, 2-mercaptoethanol, 3-mercaptopropionic acid, benzene-1,2,4-trithiol, trithiocyanuric acid, glycerol tris(thioglycolate), 2,2'-dithiodiethanol, dithiothreitol, thioglycerol, bis(3-mercaptopropyl) ether, bis(2-mercaptoethyl) ether, dithiobutylamine, dithiopropionic acid, tetrakis(2-mercaptoethyl) orthosilicate, cysteamine, cysteine, glutathione, thiomalic acid, 2-mercaptosuccinic acid, mercaptoundecanoic acid, 4-mercaptobenzoic acid, and mercaptomethylsiloxane. In a present disclosure, the polythiol is polyerythritol tetrakis merkaptopropionate (PTKMP).

In some embodiments, the hypervalent iodine compound may include, but is not limited to, [bis(trifluoroacetoxy) iodo]benzene, iodobenzene dichloride, iodosylbenzene, [hydroxy(tosyloxy)iodo]benzene, [bis(acetoxy)iodo]toluene, [diacetoxyiodo]anisole, iodo(III)perfluorobenzene, [bis(trifluoroacetoxy)iodo]toluene, 2-iodoxybenzoic acid (IBX), Dess-Martin periodinane (DMP), 1-hydroxy-1,2-benziodoxol-3-(1H)-one, [bis(acetoxy)iodo]mesitylene, [hydroxy(perfluorooctanesulfonoxy)iodo]benzene, iodo(III)azobenzene, [bis(pivaloyloxy)iodo]benzene, iodo(III) cyanobenzene, iodo(III)-substituted ferrocene, [bis(acetoxy) iodo]naphthalene, iodo(III)benzotriazole, [tosyloxy (trifluoroacetoxy)iodo]benzene, [bis(benzoate)iodo]benzene, 3,3-dimethyl-1-(aryl)-1,2-benziodoxole, 1-acetoxy-1, 2-benziodoxol-3-(1H)-one, iodo(III) phenyl ketone, iodo (III)-containing calixarene, iodo(III)-functionalized imidazole, 1-iodo-3,3-dimethyl-1,2-benziodoxole, iodo(III)-quinoline derivative, and 2-iodoxybenzenesulfonic acid. In a present disclosure, the hypervalent iodine compound is iodobenzene diacetate (IBDA).

In some embodiments, the concentration of an epoxy resin may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of DGEPA epoxy resin is 60 pbw and Bisphenol F Epoxy Resin is 20 pbw.

In some embodiments, the concentration of polythiol may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of PTKMP is 18 pbw.

In some embodiments, the concentration of a hypervalent iodine may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of IBDA is 30 pbw.

At step 56, the method 50 includes adding the mixture to the solution to form an emulsion. In some embodiments, mixing is done by magnetic stirrer, overhead stirrer, ultrasonic probe, vortex mixer, paddle mixer, impeller mixer, high-shear mixer, planetary mixer, ball mill, three-roll mill, static mixer, ribbon blender, screw mixer, drum tumbler, fluidized bed mixer, centrifugal mixer, propeller stirrer, anchor stirrer, sigma blade mixer, and conical screw mixer. In a present disclosure, high-shear mixing is done by high-speed disperser or rotor-stator homogenizer.

At step 58, the method 50 includes adding the emulsion to an organic solvent to form the first microcapsule. In some embodiments, the organic solvent may include, but is not limited to, toluene, acetone, methanol, ethanol, isopropanol, n-butanol, ethyl acetate, butyl acetate, methyl ethyl ketone, methyl isobutyl ketone, tetrahydrofuran, dimethylformamide, dimethyl sulfoxide, acetonitrile, chloroform, dichloromethane, carbon tetrachloride, benzene, cyclohexane, hexane, heptane, octane, diethyl ether, petroleum ether, dioxane, formamide, nitromethane, N-methyl-2-pyrrolidone, ethylene glycol, and propylene glycol. In a present disclosure, organic solvent is xylene.

FIG. 2 illustrates a schematic flow chart of a method 70 of making the second microcapsule. The order in which the method 70 is described is not intended to be construed as a limitation, and any number of the described method steps can be combined to implement the method 70. Additionally, individual steps may be removed or skipped from the method 70 without departing from the spirit and scope of the present disclosure.

At step 72, the method 70 includes dissolving cellulose acetate butyrate in xylene to form a solution. In some embodiments, the concentration of cellulose acetate butyrate may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of cellulose acetate butyrate is 10 pbw.

In some embodiments, the concentration of xylene may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of xylene is 30 pbw.

At step 74, the method 70 includes mixing a diamine and a photoinitiator to form a mixture. In some embodiments, the photoinitiator may include, but is not limited to, benzoin methyl ether, benzoin ethyl ether, benzoin isobutyl ether, benzoin isopropyl ether, benzil, benzil dimethyl ketal, 1-hydroxycyclohexyl phenyl ketone, 2-benzyl-2-(dimethylamino)-1-(4-morpholinophenyl)-butanone-1, ethyl 4-dimethylaminobenzoate, isopropylthioxanthone, 2-chlorothioxanthone, 2-methylthioxanthone, camphorquinone, benzophenone, acetophenone, 4-methoxyacetophenone, 4-phenylbenzophenone, 2-ethylhexyl 4-dimethylaminobenzoate, diphenyl(2,4,6-trimethylbenzoyl)phosphine oxide (TPO), bis(2,4,6-trimethylbenzoyl)-phenylphosphine oxide (BAPO), phenylbis(2,4,6-trimethylbenzoyl)phosphine oxide, thioxanthone, 1-phenyl-1,2-propanedione, 2,4,6-trimethylbenzoyldiphenylphosphine oxide, 2-hydroxy-2-methyl-1-phenylpropan-1-one, methyl o-benzoylbenzoate, diethoxyacetophenone, 2-isopropylthioxanthone, 1,1-dichloroacetophenone, and 4,4'-bis(dimethylamino)benzophenone. In a present disclosure, the photoinitiator is 2,2-dimethoxy-2-phenylacetophenone (DMPA).

In some embodiments, the diamine may include, but is not limited to, ethylenediamine, hexamethylenediamine, 1,3-diaminopropane, 1,4-diaminobutane, 1,5-diaminopentane, 1,6-diaminohexane, p-phenylenediamine, m-phenylenediamine, o-phenylenediamine, 4,4'-diaminodiphenylmethane, 3,3'-diaminodiphenylmethane, 4,4'-diaminodiphenyl sulfone, isophorone diamine, 2-methylpentamethylenediamine, 1,2-diaminocyclohexane, cyclohexane-1,4-diamine, 4,4'-diaminodicyclohexylmethane, xylylenediamine, 1,3-bis(aminomethyl)cyclohexane, 1,8-diaminooctane, 1,10-diaminodecane, 1,2-diaminopropane, 2,2-bis(aminomethyl)-1,3-propanediol, bis(4-aminocyclohexyl) methane, 3,5-diaminobenzoic acid, 2,6-diaminopyridine, diaminonaphthalene, bis(3-aminopropyl)amine, and 4,4'-methylenebis(cyclohexylamine). In a present disclosure, the diamine is N,N,N',N'-tetramethyl-1,6-hexanediamine.

In some embodiments, the concentration of diamine may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of diamine is 30 pbw.

In some embodiments, the concentration of photoinitiator may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of photoinitiator is 2 pbw.

At step 76, the method 70 includes adding the mixture to the solution to form an emulsion. In some embodiments, mixing is done by magnetic stirrer, overhead stirrer, ultrasonic probe, vortex mixer, paddle mixer, impeller mixer, high-shear mixer, planetary mixer, ball mill, three-roll mill, static mixer, ribbon blender, screw mixer, drum tumbler, fluidized bed mixer, centrifugal mixer, propeller stirrer, anchor stirrer, sigma blade mixer, and conical screw mixer. In a present disclosure, high-shear mixing is done by high-speed disperser or rotor-stator homogenizer.

At step 78, the method 70 includes adding the emulsion to an organic solvent to form the second microcapsule. In some embodiments, the organic solvent may include, but is not limited to, toluene, acetone, methanol, ethanol, isopropanol, n-butanol, ethyl acetate, butyl acetate, methyl ethyl ketone, methyl isobutyl ketone, tetrahydrofuran, dimethylformamide, dimethyl sulfoxide, acetonitrile, chloroform, dichloromethane, carbon tetrachloride, benzene, cyclohexane, hexane, heptane, octane, diethyl ether, petroleum ether, dioxane, formamide, nitromethane, N-methyl-2-pyrrolidone, ethylene glycol, and propylene glycol. In a present disclosure, organic solvent is xylene.

FIG. 3 illustrates a schematic flow chart of a method 90 of making the third microcapsule. The order in which the method 90 is described is not intended to be construed as a limitation, and any number of the described method steps can be combined to implement the method 90. Additionally, individual steps may be removed or skipped from the method 90 without departing from the spirit and scope of the present disclosure.

At step 92, the method 90 includes dissolving cellulose acetate butyrate in xylene to form a solution. In some embodiments, the concentration of cellulose acetate butyrate may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of cellulose acetate butyrate is 10 pbw.

In some embodiments, the concentration of xylene may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of xylene is 30 pbw.

At step 94, the method 90 includes mixing a phosphine to form a mixture. In some embodiments, the phosphine may include, but is not limited to, triphenylphosphine, triethylphosphine, trimethylphosphine, tripropylphosphine, triisopropylphosphine, tricyclohexylphosphine, tris(2-methoxyphenyl)phosphine, tris(4-methoxyphenyl)phosphine, tris(4-fluorophenyl)phosphine, tris(3,5-dimethylphenyl)phosphine, tris(p-tolyl)phosphine, tris(m-tolyl)phosphine, tris(o-tolyl)phosphine, tris(2-furyl)phosphine, tris(2-thienyl)phosphine, tris(2-pyridyl)phosphine, tri(o-anisyl)phosphine, tri(naphthyl)phosphine, tris(4-chlorophenyl)phosphine, tris(4-trifluoromethylphenyl)phosphine, dimethylphenylphosphine, diphenylmethylphosphine, dicyclohexylphenylphosphine, diphenylcyclohexylphosphine, methyldicyclohexylphosphine, dimethylcyclohexylphosphine, methyldiethylphosphine, diisopropylphenylphosphine, bis(2-methoxyphenyl)phenylphosphine, and diphenyl-2-pyridylphosphine. In a present disclosure, the phosphine is tributyl phosphine (TBP).

In some embodiments, the concentration of phosphine may range from 5-100 parts by weight (pbw), preferably 10-100 pbw, preferably 15-100 pbw, preferably 20-100 pbw, preferably 25-100 pbw, preferably 30-100 pbw, preferably 35-100 pbw, preferably 40-100 pbw, preferably 45-100 pbw, preferably 50-100 pbw, preferably 55-100 pbw, preferably 60-100 pbw, preferably 65-100 pbw, preferably 70-100 pbw, preferably 75-100 pbw, preferably 80-100 pbw, preferably 85-100 pbw, preferably 90-100 pbw, preferably 95-100 pbw. In a present disclosure, the concentration of phosphine is 20 pbw.

At step 96, the method 90 includes adding the mixture to the solution to form an emulsion. In some embodiments, mixing is done by magnetic stirrer, overhead stirrer, ultrasonic probe, vortex mixer, paddle mixer, impeller mixer, high-shear mixer, planetary mixer, ball mill, three-roll mill, static mixer, ribbon blender, screw mixer, drum tumbler, fluidized bed mixer, centrifugal mixer, propeller stirrer, anchor stirrer, sigma blade mixer, and conical screw mixer. In a present disclosure, high-shear mixing is done by high-speed disperser or rotor-stator homogenizer.

At step 98, the method 90 includes adding the emulsion to an organic solvent to form the third microcapsule. In some embodiments, the organic solvent may include, but is not limited to, toluene, acetone, methanol, ethanol, isopropanol, n-butanol, ethyl acetate, butyl acetate, methyl ethyl ketone, methyl isobutyl ketone, tetrahydrofuran, dimethylformamide, dimethyl sulfoxide, acetonitrile, chloroform, dichloromethane, carbon tetrachloride, benzene, cyclohexane, hexane, heptane, octane, diethyl ether, petroleum ether, dioxane, formamide, nitromethane, N-methyl-2-pyrrolidone, ethylene glycol, and propylene glycol. In a present disclosure, organic solvent is xylene.

The following examples are provided solely for illustration and are not to be construed as limitations of the present disclosure, as many variations thereof are possible without departing from the spirit and scope of the present disclosure.

EXAMPLES

The following examples demonstrate a method for preparation of an alkyd-polyester paint. The examples are provided solely for illustration and are not to be construed as limitations of the present disclosure, as many variations thereof are possible without departing from the spirit and scope of the present disclosure.

Example 1: Self-Amelioration Process

The self-ameliorating operation of the invention is initiated when a discontinuity-such as a crack, fissure, breach, or fracture-forms within the alkyd-polyester paint matrix, often due to mechanical stress from aircraft operations, thermal cycling, or chemical exposure. This physical disruption causes embedded hollow core-shell microcapsules (pods) to rupture precisely at the damage site. Once ruptured, the liquid self-ameliorating payloads from Pods 1, 2, and 3 are released into the fissure, where they mix and initiate a sequence of complementary chemical reactions. Pod 1 releases epoxy, PTKMP, and the initiator IBDA, which trigger thiol-epoxy and thiol-ene polymerizations, forming a crosslinked polymeric network. If UV light is available, DMPA from Pod 2 activates further thiol-ene crosslinking involving ALA4, enhancing the structural integrity of the repair. Simultaneously, TBP from Pod 3 catalyzes the anionic polymerization of the epoxy monomers from Pod 1, forming a dense thermoset network, while also initiating disulfide metathesis reactions that enable dynamic covalent bond exchange and molecular reorganization across the crack. These synergistic reactions result in the in-situ formation of a cohesive, highly crosslinked remediated zone that bonds across the discontinuity, seals the discontinuity, halts crack propagation, and/or re-bonds the separated matrix regions.

This process is part of a continuous operational cycle, beginning from the initial application of the paint. In the intact state, the alkyd-polyester paint is applied with uniformly dispersed pods containing payloads encapsulated in robust shells made of CAB, ethyl cellulose, PLA, or PMMA. The system remains inert and stable, providing the required surface protection and visibility for runway applications. Upon damage formation, operational or environmental stresses induce micro-cracks or larger defects, prompting the activation event—the rupture of the responsive pods and release of their reactive contents into the discontinuity. During the reaction phase, the various payloads mix and initiate the multi-modal remediation mechanisms: thiol-epoxy and thiol-ene polymerizations, anionic epoxy polymerization catalyzed by TBP, and disulfide metathesis—all proceeding in parallel or sequence to construct a new polymeric network. The formation of the remediated zone results in the complete filling and sealing of the crack, effectively restoring physical continuity. Finally, in the post-remediation state, the cured network reinstates the mechanical strength, chemical resistance, and thermal stability of the original paint, maintaining the surface integrity and extending its operational lifespan. This system ensures that the paint actively responds to and heals damage over time, reducing maintenance demands and enhancing the durability of airport runway markings.

Example 2: Components and Steps

Components

The self-ameliorating runway paint system is built upon a robust alkyd-polyester paint matrix, which serves as the foundational structure, imparting mechanical strength and baseline durability. Embedded within this matrix are fissure-responsive self-ameliorating pods, which act as the primary delivery vehicles for the healing agents. These pods are engineered with protective shell materials such as cellulose acetate butyrate (CAB), ethyl cellulose, polylactic acid (PLA), and polymethyl methacrylate (PMMA), selected for their compatibility with the matrix and their ability to rupture under stress or fissure formation. Each pod type contains a distinct payload: Pod 1 carries a mixture of epoxy resin, PTKMP (a multifunctional thiol), and IBDA (a radical initiator), forming the core reactive system. Pod 2 includes ALA4 and DMPA, providing 'ene' functionalities and a photoinitiator that enables UV-triggered crosslinking. Pod 3 contains TBP, a catalyst that facilitates various polymerization mechanisms and dynamic covalent interactions, important for the autonomous repair process. Together, these components ensure targeted release and on-demand repair of micro-damages, enhancing the paint's durability and extending its service life under demanding operational conditions.

The self-ameliorating mechanism is initiated by pod rupture, which is triggered by the formation of discontinuities, such as cracks or fissures, in the paint matrix. Upon rupture, the rapid and preferably complete mixing of payloads is important to ensure that all reactive agents-released from different pods-interact efficiently at the damage site. This initiates multi-modal remediation reactions, including thiol-epoxy and thiol-ene click reactions, anionic polymerization, and disulfide metathesis. These synergistic processes collectively contribute to the in-situ formation of a new polymeric network. As a result, a cohesive remediated zone is formed-a solid, functional patch that seamlessly fills and seals the damaged area, restoring the structural and functional integrity of the coating with minimal external intervention.

Pod size typically ranges from 10 μm to 100 μm, with a preferred range of 40-80 μm to ensure efficient release into fissures while maintaining surface smoothness and visual uniformity. The pod concentration within the paint matrix is maintained between 1 wt % and 30 wt %, with an optimal range of 5-20 wt % to balance healing effectiveness with the mechanical and aesthetic properties of the coating. Pod shell thickness spans 100 nm to 1 μm, ideally between 200 nm and 0.7 μm, providing enough strength to contain the payload during storage and application but ensuring rupture upon damage. The stoichiometric ratios of reactive components, such as thiol to epoxy or thiol to ene, are controlled within a broad range of 0.5:6 to 2:1, with near-stoichiometric ratios of 1:3 to 1.2:1 being preferred for efficient crosslinking and high conversion rates.

Further tuning involves the concentration of functional additives. The photoinitiator (DMPA), used for UV-activated reactions in Pod 2, is used at 0.1-5 wt % of total reactive monomers, with 0.5-2 wt % being optimal to avoid side reactions and excessive cost. Similarly, the catalyst (TBP) in Pod 3 is employed at 0.1-5 wt %, with a preferred concentration of 0.5-2 wt % to enable multiple reaction pathways without impairing film properties. The operational temperature range for self-amelioration spans from −40° C. to +80° C., accommodating a wide variety of environmental conditions, although 0° C. to +60° C. is optimal for reliable reaction kinetics. The system is designed to target discontinuity widths from 10 μm to 2 mm, ideally 50 μm to 1 mm, covering both micro-cracks and moderate surface fissures typically observed in runway coatings. These parameters-derived from common practices in polymeric self-healing systems-serve as a guideline, although final optimization would require empirical validation through rigorous experimental testing.

Example 3: Preparation of Alkyd Resin

The alkyd resin, an important component of the paint matrix, is synthesized via a controlled polycondensation (esterification) reaction. This reaction involves the combination of polyhydric alcohols (such as glycerol or pentaerythritol) with polybasic acids or their anhydrides (such as phthalic anhydride) in the presence of natural oils or fatty acids. During the reaction, ester bonds are formed between the hydroxyl groups of the alcohols and the carboxylic acid groups of the acids, releasing water as a byproduct. The process is carefully controlled in terms of temperature, reactant ratio, and reaction time to obtain a resin with the desired molecular structure and properties. The resulting alkyd resin is a thermosetting polymer that provides adhesion, gloss, flexibility, and durability to the paint, making it suitable for protective and decorative coatings.

For the synthesis of alkyd resin, the following materials are required: Phthalic anhydride (25 parts by weight (pbw)), pentaerythritol (15 pbw), soybean oil, refined (60 pbw) (representing the fatty acid component), Catalyst (0.05-0.1 pbw of a tin catalyst (e.g., Dibutyltin dilaurate) to accelerate esterification).

Synthesis of Alkyd Resin

The synthesis of alkyd resin begins with charging soybean oil and pentaerythritol into a glass-lined or stainless steel reactor equipped with an agitator, thermometer, nitrogen inlet for inert atmosphere, and a Dean-Stark trap with condenser. The mixture is gradually heated to around 180° C. under continuous agitation and a slow nitrogen purge to prevent oxidation. This is followed by the alcoholysis step, where the mixture is maintained at 180-200° C. for 1-2 hours until it becomes clear and homogeneous, indicating the formation of monoglycerides. A small sample can be tested for methanol solubility to confirm this stage. Subsequently, phthalic anhydride is slowly added to the reactor under agitation. As this step is exothermic, careful control of the temperature is important to avoid spikes. The temperature is then increased to 220-240° C. to initiate the esterification (polyesterification) reaction, during which water—a byproduct of esterification—is continuously removed using the Dean-Stark trap. The progress of the reaction is monitored by measuring the acid value (AV) and viscosity. Completion is indicated by reaching a target AV, typically between 5-15 mg KOH/g, and the desired viscosity, which usually takes 4-8 hours. After completion, the resin is cooled to 100-120° C. and then filtered while hot to remove any insoluble impurities.

Example 4: Preparation of Alkyd Polyester Blend

The synthesized alkyd resin is then blended with a pre-manufactured polyester resin to form the core paint matrix. The synthesized alkyd resin, known for its adhesion, flexibility, and durability, is subsequently blended with a pre-manufactured polyester resin to form the core paint matrix. This combination leverages the properties of both resins—while the alkyd component enhances the coating's gloss, flow, and weather resistance, the polyester resin contributes to chemical resistance, hardness, and mechanical strength. The resulting paint matrix exhibits improved performance characteristics, making it suitable for demanding applications such as protective and industrial coatings.

Materials and Proportions

For the synthesis of an alkyd-polyester blend, the following materials are used: prepared alkyd resin (75 parts by weight, pbw) and polyester resin (25 pbw). The polyester component is a hydroxyl-functional unsaturated polyester resin for coatings, typically with a hydroxyl value of 50-100 mg KOH/g and a glass transition temperature (Tg) appropriate for film formation.

Synthesis of Alkyd-Polyester Blend

The blending process begins with mixing the prepared alkyd resin into a clean, agitated mixing vessel. Under continuous moderate agitation, typically around 200 rpm, the polyester resin is slowly added to the alkyd resin. This gradual addition ensures proper dispersion and prevents phase separation. The mixing is continued until a uniform and homogeneous blend is achieved. The entire blending process is typically carried out at room temperature to maintain the integrity and stability of the resin components.

Example 5: Preparation of Granule (Pod)

Granule (pod) is Synthesized by Water-Free, Low-Temperature Solvent

Evaporation/Extraction technique. This method ensures the sensitive Ameliorating payloads are not exposed to water or high temperatures. Cellulose Acetate Butyrate (CAB) is used as the example shell polymer, noting that ethyl cellulose, polylactide (PLA), or poly(methyl methacrylate) (PMMA) are equally viable alternatives under similar conditions.

Materials and Proportions

The formulation involves the preparation of microencapsulated systems using Cellulose Acetate Butyrate (CAB-381-20) at 10 parts by weight (pbw). Xylene, a volatile non-aqueous solvent compatible with CAB and inert to the core materials, is used at 30 pbw to dissolve the shell polymer. For the extraction or precipitation step, a non-solvent such as heptane or an isoparaffinic hydrocarbon (e.g., Isopar G) is employed at 100 pbw, chosen for its miscibility with xylene but incompatibility with CAB, ensuring effective shell formation. The core consists of multiple payload pods: Pod 1 includes 60 pbw of DGEPA epoxy resin (e.g., EPON 828), 20 pbw of Bisphenol F epoxy resin (e.g., EPON 862) for reduced viscosity and structural diversity, 18 pbw of polyerythritol tetrakis(mercaptopropionate) (PTKMP), and 2 pbw of iodobenzene diacetate (IBDA). Pod 2 contains 30 pbw of N1N1N6N6-tetraallyl hexane-1,6-diamine (ALA4) and 2 pbw of 2,2-dimethoxy-2-phenylacetophenone (DMPA) as a photoinitiator. Pod 3 is composed of 20 pbw of pure tributyl phosphine (TBP). To control core viscosity if necessary, a thickening agent such as fumed silica or fine titanium dioxide ($TiO_2$) may be added in concentrations ranging from 0.5 to 2 pbw per 100 pbw of the liquid core material.

Synthesis of Granule (Pod)

The encapsulation process begins with the preparation of the shell polymer solution by dissolving 10 parts by weight (pbw) of Cellulose Acetate Butyrate (CAB) in 30 pbw of xylene within a reaction vessel equipped with an agitator. This is carried out at room temperature (20-25° C.) under continuous stirring until a clear, homogeneous solution is obtained. Separately, the payloads for each pod type are prepared. Pod 1 is formulated by thoroughly mixing DGEPA epoxy resin, Bisphenol F epoxy resin, PTKMP, and IBDA, with the optional addition of fumed silica or $TiO_2$ if viscosity adjustment is required. Pod 2 consists of a well-mixed combination of ALA4 and DMPA, with the optional addition of fumed silica or $TiO_2$ if viscosity adjustment is required. Pod 3 contains pure tributyl phosphine (TBP), with the optional addition of fumed silica or $TiO_2$ if viscosity adjustment is required.

For emulsification, each payload is slowly added to the agitated CAB/xylene solution, followed by high-shear mixing—such as with a high-speed disperser or rotor-stator homogenizer—for about 20 minutes at room temperature. This step produces a stable emulsion of payload droplets suspended in the polymer solution. The droplet size is controlled through mixing parameters to achieve pod diameters ranging from 20 to 50 micrometers.

To form the pod shells, the resulting emulsion is gradually introduced into a larger volume of a vigorously stirred non-solvent phase-either heptane or an isoparaffinic hydrocarbon and agitated at room temperature (20-25° C.). This prompts the diffusion of xylene into the non-solvent, causing the CAB to precipitate around the core droplets, effectively forming a solid polymer shell. The low processing temperature preserves the integrity of the sensitive payloads.

Once shell formation is complete, agitation is stopped to allow the pods to settle. The supernatant is decanted, and the pods are washed multiple times with fresh heptane to eliminate residual xylene and unreacted materials. Filtration is used to collect the cleaned pods. Finally, drying is carried out under vacuum or a gentle nitrogen purge at low temperatures (5-15° C.) for 24-48 hours to safely remove any remaining solvent without degrading the core materials. The resulting microcapsules typically exhibit a shell thickness between 200 nm and 1 µm and contain a payload concentration of approximately 60-85% by weight, depending on the formulation and processing conditions. SEM analysis confirms the successful formation of discrete, spherical microcapsules. Image analysis of multiple batches indicates a consistent particle size distribution within the target range of 20 to 50 micrometers with an average shell thickness measured between 200 and 700 nanometers. TGA was used to quantitatively determine the payload content of the microcapsules by measuring the mass loss associated with the evaporation and decomposition of the encapsulated liquid core. The analysis consistently shows a mass loss between 65% and 85% by weight, corresponding directly to the core payload content. This high loading efficiency is critical for delivering a sufficient volume of healing agents to remediate discontinuities. FTIR spectroscopy was employed to verify the chemical composition of the microcapsules and ensure the stability of the reactive payloads during encapsulation. It verifies the presence of both the shell material and the encapsulated payloads without evidence of premature reaction, confirming the payloads remain stable and isolated. The spectra of the purified pods show distinct signature peaks for both the cellulose acetate butyrate (CAB) shell material (e.g., C=O stretch at ~1740 $cm^{-1}$) and the specific encapsulated payloads (e.g., epoxy oxirane ring stretch at ~915 $cm^{-1}$ for Pod 1). Most importantly, the absence of new absorption bands indicative of polymerization, the disappearance of the epoxy ring peak or the S—H thiol peak confirms that the reactive components remain isolated, unreacted, and stable within their respective pods until rupture.

The method of pod synthesis is adapted from a combination of several previously reported methods [Zotiadis, C., et al. Progress in Organic Coatings, 161 (2021), 106475; Fatahi, A., et al. Polymers for Smart Coatings, 1 (2023), 14; Yang, M., et al. Materials and Corrosion (2025), incorporated herein by reference in their entirety]

Example 6: Paint Formation and Application

The prepared alkyd-polyester blend is then formulated into the final self-ameliorating paint with the inclusion of the pods. To this matrix, the synthesized microencapsulated pods—each containing reactive healing agents—are uniformly incorporated. These pods remain stably suspended within the coating system without premature rupture, preserving their functionality. Upon application and curing of the paint, the formulation forms a continuous protective film. In the event of mechanical damage or surface cracking, the embedded pods rupture at the damaged site, releasing their reactive payloads. These released agents then undergo in-situ chemical reactions, effectively sealing the defect and restoring the coating's protective integrity. This smart, responsive behavior significantly enhances durability, longevity, and maintenance efficiency of the coated surface.

Materials and Proportions

The self-ameliorating paint formulation consists of a carefully balanced mixture of components to ensure optimal performance and responsiveness. The alkyd-polyester blend (30 to 65 parts by weight (pbw)) of the formulation. 10 to 55 pbw of pigments and functional additives are added, including materials such as titanium dioxide, rheology modifiers, UV stabilizers, and anti-settling agents. The fissure-responsive self-ameliorating pods is incorporated at 5 to 20 pbw. These include 2-8 pbw of Pod 1, 1-6 pbw each of Pods 2 and 3, each tailored with specific reactive healing agents. To achieve the desired application viscosity and ease of film formation, a suitable solvent such as xylene or high-flash aromatic naphtha (e.g., Solvesso 100) is added at 5-20 wt % of the total paint formulation. These solvents are selected specifically for their non-polar nature and their inability to dissolve the microcapsule shells made of CAB, ethyl cellulose, PLA, or PMMA, ensuring the stability and integrity of the encapsulated payloads throughout storage and application.

Synthesis of Paint Formation

The formulation of the self-ameliorating paint begins with the dispersion of pigments. In this step, the alkyd-polyester blend is mixed with selected pigments and a portion of the solvent in a high-speed disperser, and the mixture is processed until a fine grind—typically a Hegman gauge reading of 6 to 7—is achieved, ensuring optimal color development and coverage. Once the pigment dispersion is complete, functional additives such as rheology modifiers, UV stabilizers, and anti-settling agents are incorporated and thoroughly mixed to enhance the paint's performance characteristics. Following this, the step of incorporating the fissure-responsive self-ameliorating pods is carried out. A pre-mixed dry blend of Pod 1, Pod 2, and Pod 3 is carefully added to the formulation under low-shear agitation (around 100 rpm/min) to prevent premature rupture of the microcapsules while ensuring uniform distribution throughout the paint matrix. After successful dispersion of the pods, the paint viscosity is adjusted for application—typically targeting a range of 70 to 90 KU for airless spraying—by adding the remaining amount of solvent. Finally, the entire mixture undergoes a homogenization step under moderate agitation (approximately 200 rpm/min) to ensure a smooth, uniform, and application-ready self-ameliorating paint formulation. Providing specific, exemplary formulations is as following: two formulations represent optimized, workable embodiments of the invention. Formulation A is a White Runway Marking Paint, while Formulation B is a Yellow Runway Marking Paint. All values are in parts by weight (pbw) for the complete, mixed paint.

Formulation A: White Self-Ameliorating Runway Paint

| Component Category | Specific Component | Function | Parts by Weight (pbw) |
|---|---|---|---|
| Alkyd-Polyester Blend | Alkyd-Polyester Resin (60% NV) | Primary film former, provides adhesion & flexibility | 40.0 |
| Pigmentation | Titanium Dioxide (Rutile Grade) | Primary pigment for whiteness, opacity, and UV screening | 25.0 |
| Solvent | Xylene/Ethyl Acetate Blend (50/50 vol.) | Carrier solvent for application and viscosity control | 20.0 |

-continued

Formulation A: White Self-Ameliorating Runway Paint

| Component Category | Specific Component | Function | Parts by Weight (pbw) |
|---|---|---|---|
| Performance Additives | Anti-settling Agent (Organoclay) | Prevents pigment and pod settling | 0.3 |
| | Leveling Agent (Mod. Polyacrylate) | Ensures smooth film formation | 0.2 |
| | UV Absorber (Benztriazole) | Prevents polymer degradation from UV light | 0.2 |
| | HALS (Hindered Amine Light Stabilizer) | Scavenges radicals, prevents gloss loss & chalking | 0.1 |
| Self-Ameliorating Pods | Pod 1 (Epoxy/PTKMP/IBDA) | Primary polymer network formation via thiol-epoxy click chemistry | 4.0 |
| | Pod 2 (ALA4/DMPA) | Provides 'ene' component and UV-triggered cure | 2.5 |
| | Pod 3 (TBP) | Catalyzes anionic polymerization & disulfide metathesis | 1.0 |
| | Total Pods | | 7.5 |
| Curing System | Drier Catalyst (e.g., Cobalt Octoate) | Promotes oxidative crosslinking of the alkyd resin | 0.2 |
| | Total | | 100.0 |

Formulation B: Yellow Self-Ameliorating Runway Paint

| Component Category | Specific Component | Function | Parts by Weight (pbw) |
|---|---|---|---|
| Alkyd-Polyester Blend | Alkyd-Polyester Resin (60% NV) | Primary film former, provides adhesion & flexibility | 42.0 |
| Pigmentation | Titanium Dioxide (Rutile Grade) | Opacity and base tint | 15.0 |
| | Diarylide Yellow (PY13) | Primary yellow colorant | 5.0 |
| Solvent | Xylene/Ethyl Acetate Blend (50/50 vol.) | Carrier solvent for application and viscosity control | 19.8 |
| Performance Additives | Anti-settling Agent (Organoclay) | Prevents pigment and pod settling | 0.4 |
| | Leveling Agent (Mod. Polyacrylate) | Ensures smooth film formation | 0.2 |
| | UV Absorber (Benztriazole) | Prevents polymer degradation from UV light | 0.2 |
| | HALS (Hindered Amine Light Stabilizer) | Scavenges radicals, prevents gloss loss & chalking | 0.1 |
| Self-Ameliorating Pods | Pod 1 (Epoxy/PTKMP/IBDA) | Primary polymer network formation | 4.5 |
| | Pod 2 (ALA4/DMPA) | Provides 'ene' component and UV-triggered cure | 2.5 |
| | Pod 3 (TBP) | Catalyzes anionic polymerization & disulfide metathesis | 1.0 |
| | Total Pods | | 8.0 |
| Curing System | Drier Catalyst (e.g., Cobalt Octoate) | Promotes oxidative crosslinking of the alkyd resin | 0.2 |
| | Total | | 100.0 |

Key Rationale for the Formulations:

Pod Ratio: The ratio of Pod 1: Pod 2: Pod 3 is maintained near 4:2.5:1. This ratio is based on the stoichiometry of the intended reactions (e.g., thiol to epoxy equivalents in Pod 1, sufficient catalyst in Pod 3 to initiate polymerization).

Total Pod Content: At 7.5-8.0 wt %, the total pod loading is sufficient to provide effective self-amelioration across a network of microcracks without compromising the mechanical integrity of the paint film.

Pigment Volume Concentration: The level of $TiO_2$ is selected to provide hiding at a typical dry film thickness of 300-500 μm, which is standard for thick, durable roadway markings.

Solvent Content: The ~20% solvent content is optimized to achieve the target application viscosity of 70-90 Krebs Units (KU) for airless spraying, ensuring good transfer efficiency and film build.

Application Method (Airless Spraying)

The application of the self-ameliorating paint adheres to a strict protocol to ensure optimal performance and to prevent damage to the microcapsules.

1. Surface Preparation:

Prior to application, the concrete or asphalt runway surface be thoroughly cleaned. All loose debris, dust, oil, grease, fuel residues, and existing degraded paint be removed using mechanical methods (e.g., power sweeping, shot blasting) and/or chemical cleaning. The surface must be completely dry.

2. Paint Preparation:

The paint is gently stirred or rolled (not shaken) to ensure a homogeneous mixture without damaging the pods. It is crucial to avoid high-shear mixing at this stage.

3. Equipment Setup:

Equipment: A professional-grade airless spray unit is used.

Hose & Gun: a hose and spray gun compatible with solvent-based coatings is used.

Tip Selection: A tip orifice size and spray pattern (e.g., 0.021"-0.025" orifice, 6"-12" fan pattern) appropriate for the high viscosity of the paint and the desired line width.

Pressure: The pump pressure adjusted (typically between 1500-2500 psi) to achieve a smooth, atomized spray without tailing or fisheyes. The goal is to achieve the specified 300-500 μm wet film thickness.

4. Application:

The spray gun perpendicular holded to the surface at the manufacturer's recommended distance (typically 12-18 inches).

Smooth, consistent strokes with a 50% overlap between passes to ensure uniform coverage and avoid striping is used.

The paint is applied at a constant speed to achieve a continuous, homogenous film.

5. Curing:

The paint typically tacked-free within 30-60 minutes at 25° C. and 50% relative humidity, allowing for light foot traffic.

Full through-cure and development of ultimate mechanical and chemical properties is achieved over 7-14 days under this conditions.

The self-ameliorating functionality is active once the paint film had solidified.

Application method (Airless Spraying)

Before applying the self-ameliorating paint, proper surface preparation is important to ensure optimal adhesion and performance. The concrete or asphalt runway surface must be thoroughly cleaned to remove all loose debris, dust, oil residues, moisture, or remnants of previous coatings that could interfere with the bonding of the new layer. Once the surface is clean and dry, the paint is loaded into an airless spray unit. The equipment is calibrated by adjusting the spray pressure and selecting an appropriate nozzle size to achieve the desired wet film thickness, typically in the range of 300 to 500 micrometers. With the equipment set, the paint is applied evenly across the surface using a controlled, consistent pass of the spray gun, ensuring uniform coverage and the proper embedding of the self-healing pods within the protective film.

Example 7: Curing and Performance Characteristics

Hardening Time Periods

After application, the self-ameliorating paint undergoes a two-stage curing process. The first stage, known as external hardening or tack-free time, typically occurs within 30 to 60 minutes under standard conditions of 25° C. and 50% relative humidity. During this period, the surface becomes dry to the touch, allowing for a quick return to light foot traffic without damaging the coating. The second stage, internal hardening or through-cure, takes place over a longer period-usually 7 to 14 days at 25° C. This duration is necessary for the complete crosslinking of the alkyd-polyester matrix, enabling the coating to achieve its full mechanical strength, chemical resistance, and long-term durability.

Consistency with International Standards

The base alkyd-polyester paint, prior to the incorporation of self-ameliorating functionality, is formulated to meet an international standards applicable to road and pavement marking applications. These include ASTM D711, which assesses the no-pick-up time of traffic paint; ASTM D1640 for evaluating drying, curing, and film formation of organic coatings at room temperature; ASTM D4060 for measuring abrasion resistance of organic coatings using the Taber Abraser; EN 1436 for performance criteria of road marking materials from the perspective of road users; and ASTM D4799/D5894 for accelerated weathering and UV resistance testing.

The integration of self-ameliorating pods enhances these baseline properties by enabling the paint to autonomously repair microcracks and surface discontinuities over time, thereby maintaining performance and compliance throughout a longer service life. The effectiveness of this self-healing behaviour is evaluated through several specialized methods, such as microscopic observation to confirm pod rupture and fissure filling, mechanical property recovery tests (including tensile, flexural, or scratch resistance tests) to assess strength restoration, and barrier property assessments to determine the recovery of corrosion protection and water impermeability after damage.

Example 8: Physical Measurements

The design of the pods and the Ameliorating chemistry is optimized to respond effectively to the extreme conditions prevalent on aircraft runways.

Effective Force for Pod Rupture

The rupture of self-ameliorating pods within the paint matrix is primarily triggered by localized mechanical stress generated during routine aircraft operations such as landing, braking, and turning. These actions subject the runway surface to intense forces capable of initiating controlled rupture of the encapsulated healing agents. Impact forces during aircraft landings can range from 10 to 100 MPa, creating sharp and sudden pressure spikes that induce brittle fracture of the pod shells. Similarly, braking and turning motions exert significant shear stresses typically between 5 and 50 MPa-particularly concentrated at the tips of developing fissures, which are sufficient to cleave the encapsulating shells. Additionally, ongoing surface abrasion from aircraft tires gradually wears down the coating surface, eventually exposing and breaking the pods. To ensure optimal functionality, the shell polymers selected-such as Cellulose Acetate Butyrate (CAB), ethyl cellulose, polylactide (PLA), and poly(methyl methacrylate) (PMMA)—are engineered with rupture strengths in the range of 5 to 50 MPa. This balance ensures that the pods are durable enough to withstand the rigors of paint mixing and application, yet fragile enough to respond effectively to the mechanical stresses encountered during real-world runway use.

Effective Temperatures for Self-Amelioration

The self-amelioration system is engineered to remain functional across the wide range of temperatures typically encountered on runway surfaces, from extreme cold at −30° C. to intense heat up to +70° C. Beyond ambient conditions, aircraft operations introduce localized thermal stress that can significantly exceed these limits. For example, the surface temperature beneath hot aircraft tires can reach 100-150° C., while direct exposure to jet exhaust may cause transient spikes as high as 150-200° C. To withstand such conditions, the self-healing chemistry—based on epoxy/thiol reactions and catalyzed by tributyl phosphine (TBP)—is specifically selected for its rapid reactivity and stability across this broad thermal spectrum. This ensures that crack sealing and material recovery occur efficiently, even under fluctuating or extreme temperatures. Additionally, the use of a low-temperature encapsulation method during pod fabrication preserves the chemical integrity of the core materials, preventing thermal degradation prior to activation and ensuring long-term reliability of the self-ameliorating response.

Chemical Stress

Runway coatings are frequently exposed to harsh chemicals such as jet fuel (kerosene) from spills and glycol-or acetate-based de-icing fluids, which can degrade conventional coatings over time. The self-ameliorating paint system is specifically formulated to withstand these aggressive environments. Upon activation, the epoxy and polythiol components within the pods react to form highly crosslinked thermoset networks, which are inherently resistant to chemical attack. This robust polymer matrix provides a strong barrier against solvent penetration and degradation. Additionally, the presence of fluorinated components within the alkyd-polyester base enhances the overall chemical inertness of the coating, reducing permeability and preventing the ingress of contaminants into microfissures. As a result, the system effectively protects the underlying substrate from chemical damage while maintaining long-term durability in challenging airfield conditions.

Physical Measurement Facilitating Rupture and Spread

The effectiveness of the self-ameliorating system relies heavily on the optimized physical and chemical characteristics of the encapsulated pods. The pods are designed with a spherical or slightly irregular spherical morphology, which promotes uniform stress distribution and ensures predictable rupture behavior under mechanical loading. Inside, the liquid payloads are formulated with low viscosities, typically in the range of 50 to 500 centipoise (cP), enabling them to flow readily through capillary action once released. This low viscosity is important for efficient capillary action, allowing the released contents to rapidly spread and penetrate into the smallest discontinuities and fissures. Additionally, the payloads possess a relatively low surface tension, generally between 20 and 40 mN/m, enhancing their ability to wet the damaged surfaces and spread efficiently within the cracks. The interfacial adhesion between the pod shell—composed of materials like Cellulose Acetate Butyrate (CAB)—and the surrounding alkyd-polyester matrix is carefully balanced: it is strong enough to keep the pods well-dispersed and embedded during application and curing, yet weak enough to allow clean rupture and content release upon stress. Furthermore, the shell material is engineered to be brittle rather than elastic, ensuring that it fractures easily under the influence of crack propagation, thus facilitating reliable activation of the self-healing mechanism when needed.

This design ensures that the self-ameliorating paint system responds to the specific, harsh conditions of an aircraft runway, providing continuous remediation and re-establishment of integrity to maximize operational safety and minimize maintenance.

The present disclosure provides a range of advantages, particularly for high-demand applications such as airport runway coatings. Foremost among these is the paint's ability to self-ameliorate a variety of surface defects—including discontinuities, fissures, breaches, and fractures—which would otherwise compromise the integrity and longevity of conventional coatings. The built-in repair capability significantly extends the service life of runway markings by halting damage propagation at an early stage, thereby reducing the need for frequent reapplication. As a result, maintenance demands are minimized, leading to cost savings in materials, labor, and downtime, especially important for infrastructure like airport runways where uninterrupted operation is important. Safety is also enhanced, as the self-ameliorating mechanism helps preserve the clarity and visibility of runway markings under continuous mechanical, thermal, and chemical stress, ensuring reliable guidance for aircraft operations. The formulation is robustly engineered to endure harsh airport conditions, withstanding high mechanical loads from landing gear, shear forces during braking, thermal extremes ranging from −30° C. to 200° C., and exposure to aggressive substances such as jet fuel and de-icing fluids. An important feature is its multi-modal repair system, incorporating three types of microencapsulated pods containing complementary self-healing chemistries—thiol-epoxy, thiol-ene, and anionic epoxy polymerization with phosphine catalysis—allowing rapid and effective remediation of various damage types. Additionally, the use of a water-free, low-temperature encapsulation process ensures that the reactive components within the pods remain stable and potent until activated by damage.

Numerous modifications and variations of the present disclosure are possible in light of the above teachings. It is therefore to be understood that within the scope of the appended claims, the invention may be practiced otherwise than as specifically described herein.

The invention claimed is:

1. An alkyd-polyester paint, comprising:

an alkyd resin, a polyester resin and first, second and third fissure-responsive microcapsule encapsulated compositions, the first fissure-responsive microcapsule composition comprising first microcapsules containing an epoxy resin, a polythiol and a hypervalent iodine compound;

the second fissure-responsive microcapsule composition comprising second microcapsules containing a diamine and a photoinitiator; and the third fissure-responsive microcapsule composition comprising third microcapsules containing a phosphine.

2. The alkyd-polyester paint of claim 1, further comprising a pigment.

3. The alkyd-polyester paint of claim 1, further comprising a rheology modifier, a UV stabilizer, an anti-settling agent.

4. The alkyd-polyester paint of claim 1, wherein the epoxy resin is one or more selected from the group consisting of bisphenol A diglycidyl ether (DGEPA), a diglycidyl ether of bisphenol F (DGEBF), and a cycloaliphatic epoxy.

5. The alkyd-polyester paint of claim 1, wherein the polythiol is polyerythritol tetrakis merkaptopropionate (PTKMP).

6. The alkyd-polyester paint of claim 1, wherein the hypervalent iodine compound is iodobenzene diacetate (IBDA).

7. The alkyd-polyester paint of claim 1, wherein the photoinitiator is 2,2-dimethoxy-2-phenylacetophenone (DMPA).

8. The alkyd-polyester paint of claim 1, wherein the diamine is N,N,N',N'-tetramethyl-1,6-hexanediamine.

9. The alkyd-polyester paint of claim 1, wherein the microcapsules are made of one or more polymers selected from the group consisting of cellulose acetate butyrate, ethyl cellulose, polylactide, and poly(methyl methacrylate).

10. The alkyd-polyester paint of claim 1, wherein the phosphine is tributyl phosphine (TBP).

11. The alkyd-polyester paint of claim 1, wherein the first, second and third fissure-responsive microcapsule encapsulated compositions are uniformly dispersed throughout the paint.

12. The alkyd-polyester paint of claim 1, wherein the first, second and third microcapsules are spherical and have a diameter of 10-100 μm.

13. The alkyd-polyester paint of claim 1, where in the first, second and third fissure-responsive microcapsule encapsulated compositions are 1-30 wt % of the paint.

14. The alkyd-polyester paint of claim 1, wherein the first, second and third microcapsules have a shell thickness of 100 nm-1 μm.

15. A method of repairing a defect in paint, comprising:
rupturing the first, second and third microcapsules of the alkyd-polyester pain of claim 1 such that the contents of the first second and third microcapsules release and polymerize to repair the defect in the paint,
wherein the rupturing can be caused by impact forces, shear forces, and/or abrasion.

16. The alkyd-polyester paint of claim 1, wherein the first, second and third microcapsules rupture under pressures of 10-100 MPa and shear forces of 5-50 MPa.

17. A method of making the alkyd-polyester paint of claim 1, comprising:
heating pentaerythritol and a fatty acid at 150-200° C. under nitrogen for 1-3 hours to form monoglycerides;
adding phthalic anhydride to the monoglycerides and heating the mixture to 200-260° C. to form a alkyd resin,
mixing the alkyd resin with a polyester resin and first, second and third fissure-responsive microcapsule encapsulated compositions to form the alkyd-polyester paint.

18. A method of claim 17, further comprising:
dissolving cellulose acetate butyrate in xylene to form a solution;
mixing an epoxy resin, a polythiol and a hypervalent iodine compound to form a mixture;
adding the mixture to the solution to form an emulsion;
adding the emulsion to an organic solvent to form the first microcapsule.

19. A method of claim 17, further comprising:
dissolving cellulose acetate butyrate in xylene to form a solution;
mixing a diamine and a photoinitiator to form a mixture;
adding the mixture to the solution to form an emulsion;
adding the emulsion to an organic solvent to form the second microcapsule.

20. A method of claim 17, further comprising:
dissolving cellulose acetate butyrate in xylene to form a solution;
mixing a phosphine to form a mixture;
adding the mixture to the solution to form an emulsion;
adding the emulsion to an organic solvent to form the third microcapsule.

\* \* \* \* \*